United States Patent
Spiridonov et al.

(10) Patent No.: US 10,625,274 B2
(45) Date of Patent: Apr. 21, 2020

(54) DUAL-STAGE SEPARATOR

(71) Applicant: ENERCORP SAND SOLUTIONS INC., Calgary (CA)

(72) Inventors: Nikolay Spiridonov, Magnolia, TX (US); Ryan Thomas Bowley, Calgary (CA); Rory Nagge, Calgary (CA)

(73) Assignee: ENERCORP SAND SOLUTIONS INC., Calgary, Alberta (CA)

( * ) Notice: Subject to any disclaimer, the term of this patent is extended or adjusted under 35 U.S.C. 154(b) by 127 days.

(21) Appl. No.: 16/005,778

(22) Filed: Jun. 12, 2018

(65) Prior Publication Data

US 2018/0353975 A1 Dec. 13, 2018

Related U.S. Application Data (60) Provisional application No. 62/518,324, filed on Jun. 12, 2017.

(51) Int. Cl.
| | | |
|---|---|---|
| *B04C 3/04* | (2006.01) | |
| *B04C 3/06* | (2006.01) | |
| *B01J 8/00* | (2006.01) | |
| *E21B 21/06* | (2006.01) | |
| *E21B 43/34* | (2006.01) | |
| *B04C 5/24* | (2006.01) | |
| *B04C 7/00* | (2006.01) | |
| *E21B 43/26* | (2006.01) | |
| *B04C 3/00* | (2006.01) | |

(52) U.S. Cl.
CPC ............... *B04C 3/04* (2013.01); *B01J 8/0055* (2013.01); *B04C 3/06* (2013.01); *B04C 5/24* (2013.01); *B04C 7/00* (2013.01); *E21B 21/065* (2013.01); *E21B 43/34* (2013.01); *B04C 2003/006* (2013.01); *E21B 43/26* (2013.01)

(58) Field of Classification Search
CPC .... B01J 8/0055; B04C 2003/006; B04C 3/04; B04C 3/06; B04C 5/24; B04C 7/00; E21B 21/065; E21B 43/26; E21B 43/34
See application file for complete search history.

(56) References Cited

U.S. PATENT DOCUMENTS

| | | | | | |
|---|---|---|---|---|---|
| 3,373,874 | A | * | 3/1968 | Kompert | B04B 5/005 210/261 |
| 3,893,922 | A | * | 7/1975 | Bobo | B04C 3/04 209/725 |
| 4,230,581 | A | * | 10/1980 | Beazley | B01D 21/0012 210/261 |
| 2003/0211017 | A1 | * | 11/2003 | Pankaj | C10J 3/482 422/139 |
| 2010/0206166 | A1 | * | 8/2010 | Tuomas | B01D 45/14 95/271 |

* cited by examiner

*Primary Examiner* — Dirk R Bass
(74) *Attorney, Agent, or Firm* — MH2 Technology Law Group LLP (57) ABSTRACT

An apparatus for removing particles from a fluid includes a pressure vessel having an inlet and an outlet. A centrifuge is disposed in the pressure vessel. The centrifuge is configured to remove a first portion of particles from the fluid. A cyclone separator is also disposed in the pressure vessel, such that the centrifuge extends around the cyclone separator. The cyclone separator includes an array of cyclones configured to remove a second portion of particles from the fluid.

20 Claims, 13 Drawing Sheets

DUAL-STAGE SEPARATOR

CROSS-REFERENCE TO RELATED APPLICATIONS

This application claims priority to U.S. Provisional Patent Application No. 62/518,324, filed on Jun. 12, 2017, the entirety of which is hereby incorporated by reference.

BACKGROUND

Gas resources such as shale are accessed using a process called hydraulic fracturing or "fracking." The fracturing process begins with the drilling of a well into a rock formation. This technique further involves injecting a mixture of water, sand, and a small amount of other additives (e.g., a blend of chemicals) into the well. These fluids are typically made up of about 90% water and 9.5% sand. Many of the ingredients in the remaining 0.5% of the mixture have common consumer applications in household products, detergents, and cosmetics. These chemicals are used to reduce friction, prevent bacteria growth, and protect the rock formation, making the hydraulic fracturing safer and more efficient.

The well equipment used to produce oil from the well typically includes components that are designed to separate the unwanted substances from the oil. For instance, a conventional sand separator is commonly provided at the surface of the well to remove the sand that may be present in the oil.

There are various problems with the use of the conventional sand separator to remove sand from oil or other fluids, which may be amplified because the fluids are being produced under high pressure and at high volumes. Therefore, there is a need for an improved separator.

SUMMARY

In one aspect, an apparatus for removing particles from a fluid is provided. The apparatus includes a pressure vessel having an inlet and an outlet. A centrifuge is disposed in the pressure vessel. The centrifuge is configured to remove a first portion of particles from the fluid. A cyclone separator is also disposed in the pressure vessel, such that the centrifuge extends around the cyclone separator. The cyclone separator includes an array of cyclones configured to remove a second portion of particles from the fluid.

In another aspect, a method of removing particles from a multi-phase fluid is provided. The method includes placing a dual-stage separator in fluid communication with a source of the multi-phase fluid. The dual-stage separator includes a centrifuge and a cyclone separator. The centrifuge is positioned around and upstream of the cyclone separator. The cyclone separator includes an array of cyclones. A first portion of particles is removed as the multi-phase fluid passes through the centrifuge. A second portion of particles is removed as the multi-phase fluid passes through the cyclone separator.

In yet another aspect, an apparatus for removing solid particles from a multi-phase fluid flow is provided. The apparatus includes a cylindrical high-pressure vessel with a vertical axis. A centrifuge is disposed within the high-pressure vessel at a location that is concentric with the vertical axis of the vessel. An array of cyclones is also disposed within the high-pressure vessel at a location that is concentric with the vertical axis of the vessel. The centrifuge is positioned around the cyclones. An inlet of the high-pressure vessel is directed tangentially into an annular space formed between an inner surface of the high-pressure vessel and an outer surface of the cyclones. An inlet of each cyclone is in communication with an innermost flow path of the annular space.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

The following disclosure describes several embodiments for implementing different features, structures, or functions of the invention. Embodiments of components, arrangements, and configurations are described below to simplify the present disclosure, however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive, for example, the statement "A or B" should be considered to mean "A, B, or both A and B."

In general, embodiments of the present disclosure provide an apparatus for removing particles from a multi-phase fluid by using a two stage process. In the first stage, a centrifuge removes a first portion of (e.g., large and/or dense) particles from the multi-phase fluid. In the second stage, an array of small cyclone separators remove a second portion of (e.g., smaller) particles from the multi-phase fluid. The particles in the first portion may have a larger average cross-sectional dimension (e.g., diameter) than the particles in the second portion.

Figure 1:
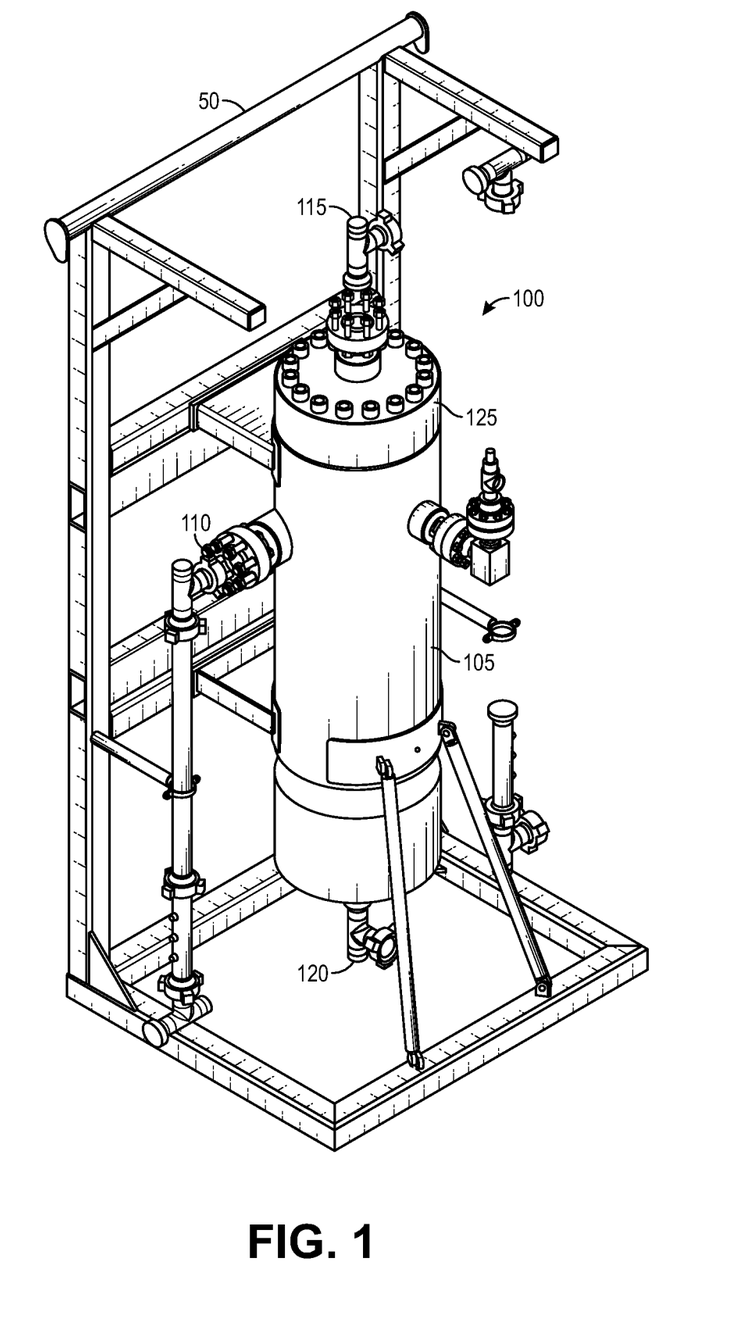
FIG. 1 illustrates a perspective view a dual-stage separator, according to an embodiment.
Figure 2:
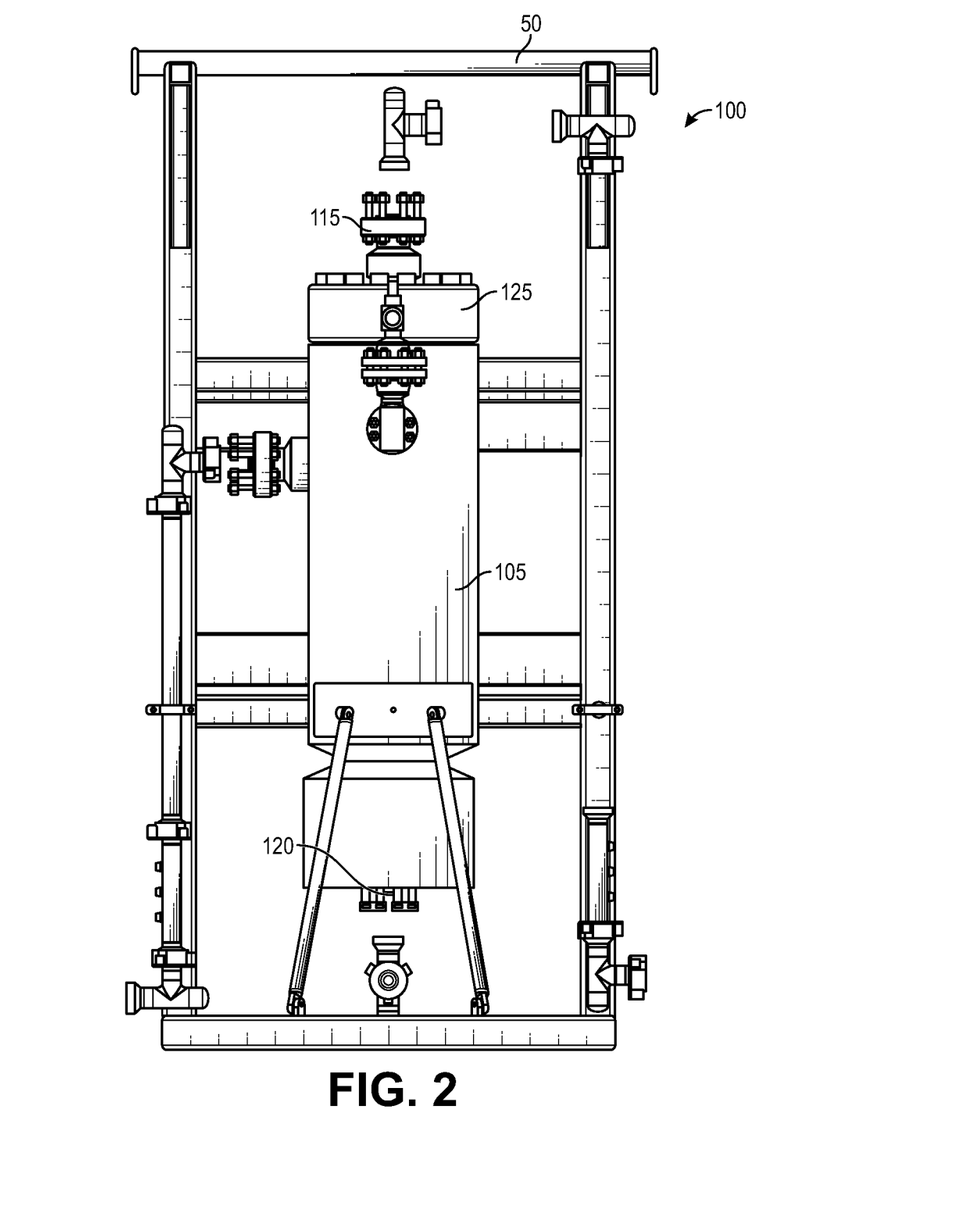
FIG. 2 illustrates a side view of the dual-stage separator and a support member, according to an embodiment.

Turning now to the specific, illustrated embodiments, FIGS. 1 and 2 illustrate a dual-stage separator 100 in a support member 50, according to an embodiment. The dual-stage separator 100 includes a pressure vessel 105 having an inlet 110, an outlet 115, and a particle cleanout valve 120. The pressure vessel 105 further includes an access flange 125 configured to be removable to access components inside the pressure vessel 105. In one embodiment, the pressure vessel 105 has a cylindrical shape. As will be described herein, the dual-stage separator 100 is configured to remove particles (e.g., sand and/or other solid particles) out of a multi-phase fluid using a two-stage process.

Figure 3:
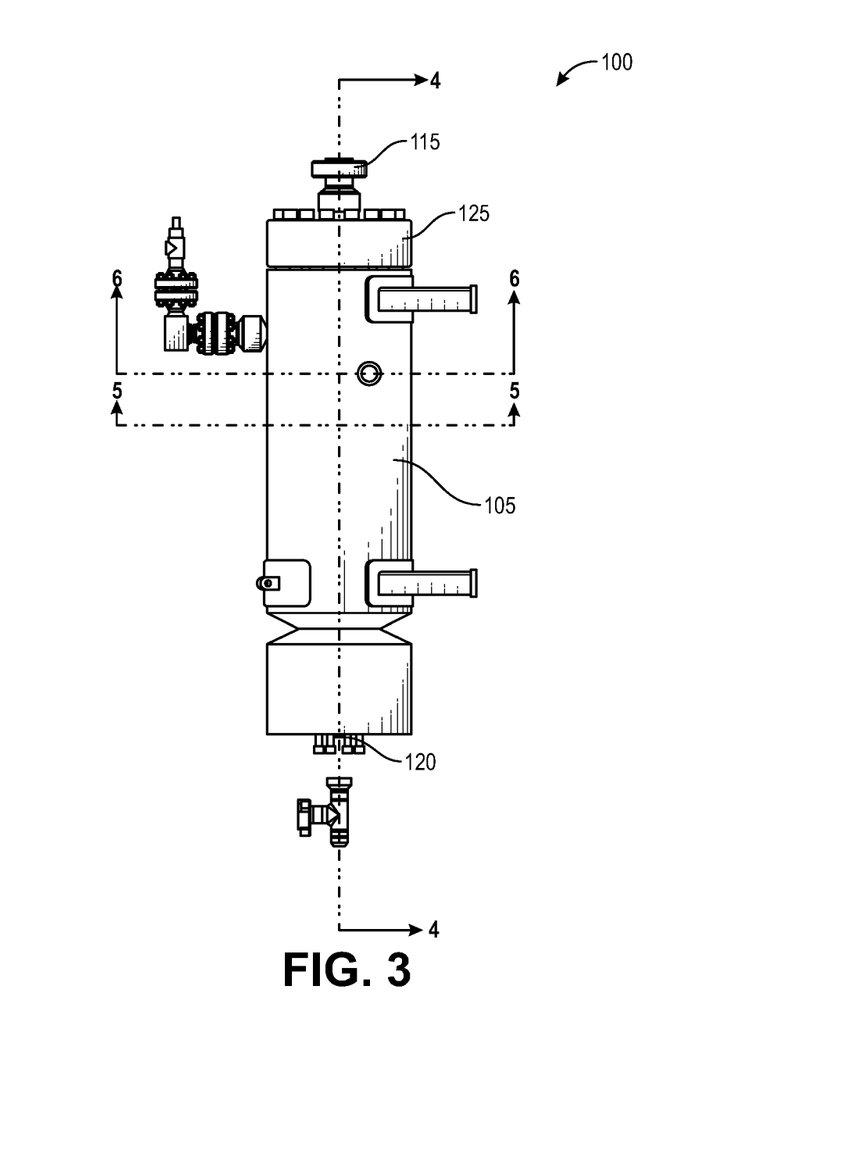
FIG. 3 illustrates another side view of the dual-stage separator, according to an embodiment.
Figure 4:
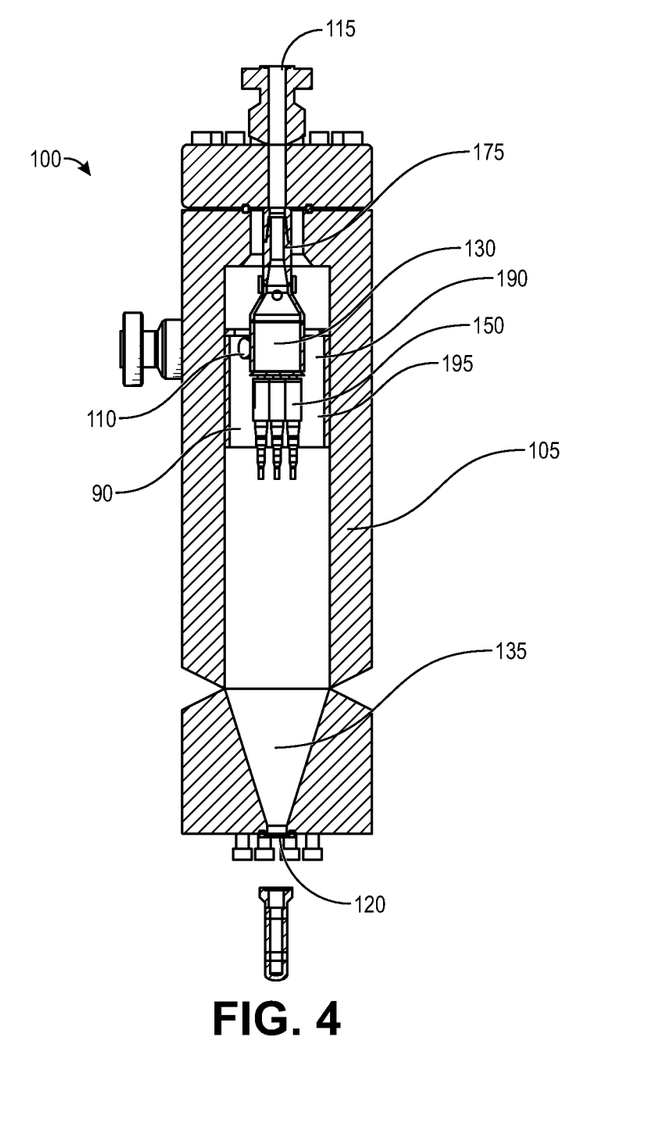
FIG. 4 is a sectional view taken along line 4-4 in FIG. 3.

FIG. 3 illustrates a side view of the dual-stage separator 100 with the support member 50 omitted (for clarity), and FIG. 4 is a sectional view taken along line 4-4 in FIG. 3. The inlet 110 is in fluid communication with an interior 90 of the pressure vessel 105. The dual-stage separator 100 includes a first stage 190 and a second stage 150. The first stage 190 includes a centrifuge 195 that is configured to remove a first portion of (e.g., large dense) particles from the multi-phase fluid. The second stage 150 includes a cyclone separator 130 that is configured to remove a second portion of (e.g., smaller) particles from the multi-phase fluid. In at least one embodiment, the second stage 150 may positioned downstream from and/or occur after the first stage 190.

As also shown in FIG. 4, the pressure vessel 105 includes a particle collection chamber 135 that receives the first portion of (e.g., large and/or dense) particles that are removed by the centrifuge 195 and/or the second portion of (e.g., smaller) particles that are removed by the cyclone separator 130. The particles may be removed from the particle collection chamber 135 by opening the valve 120. The particles may be sand and/or other solids that were in the multi-phase fluid.

Figure 5:
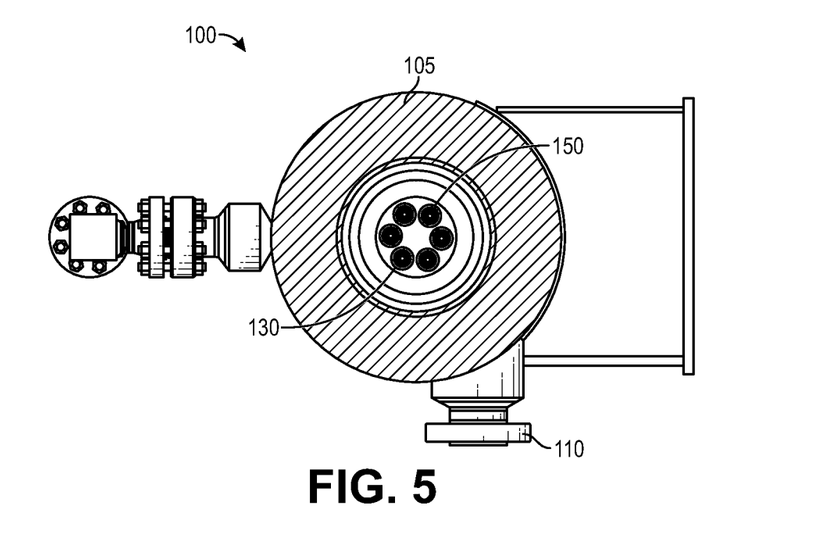
FIG. 5 is a sectional view taken along line 5-5 in FIG. 3.
Figure 6:
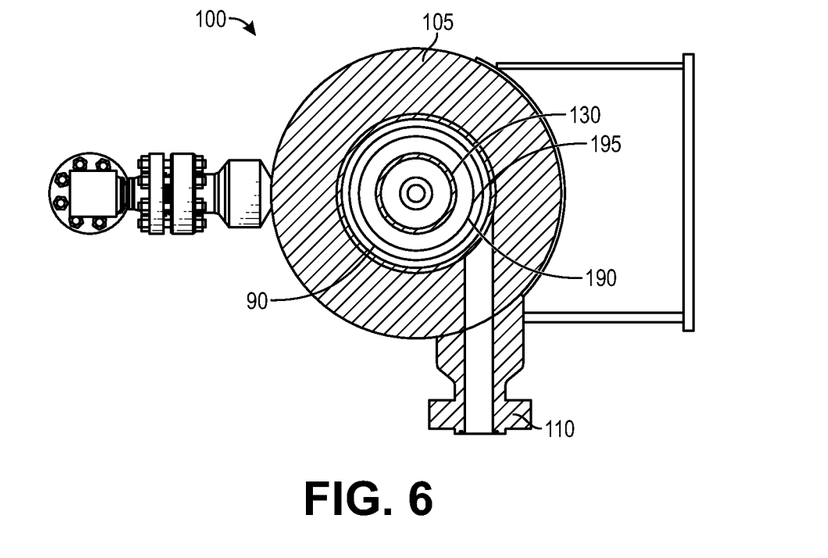
FIG. 6 is a sectional view taken along line 6-6 in FIG. 3.

FIG. 5 is a sectional view taken along line 5-5 in FIG. 3. As shown in FIG. 5, the cyclone separator 130 (i.e., the second stage 150) is disposed within the pressure vessel 105. FIG. 6 is a sectional view taken along line 6-6 on FIG. 3. As shown in FIG. 6, the centrifuge 195 (i.e., the first stage 190) is disposed within the pressure vessel 105. The centrifuge 195 is defined between the interior 90 of the pressure vessel 105 and an exterior surface of the cyclone separator 130. Also shown in FIG. 6 is the tangent entry of the inlet 110 of the dual-stage separator 100. This tangent entry generates the rotational flow of the multi-phase fluid around the first stage 190 creating a primary centrifugal separation zone.

Figure 7:
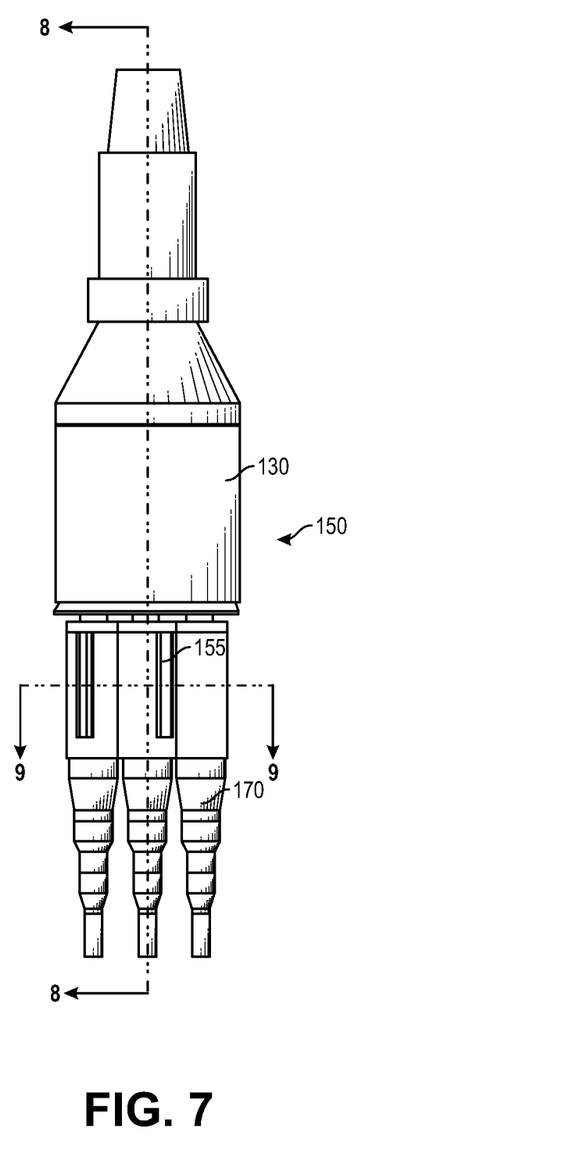
FIG. 7 illustrates a side view of a second stage of the dual-stage separator, according to an embodiment.

FIG. 7 illustrates a side view of the cyclone separator 130, according to an embodiment. The cyclone separator 130 includes a fluid outlet 175 and a plurality/array of cyclones 170. Each cyclone 170 has an inlet 155 and a particle outlet 160. The inlet(s) 155 allow(s) the partially separated multi-phase fluid from the first stage 190 to enter the cyclone(s) 170 at the vector of the fluid velocity.

Figure 8:
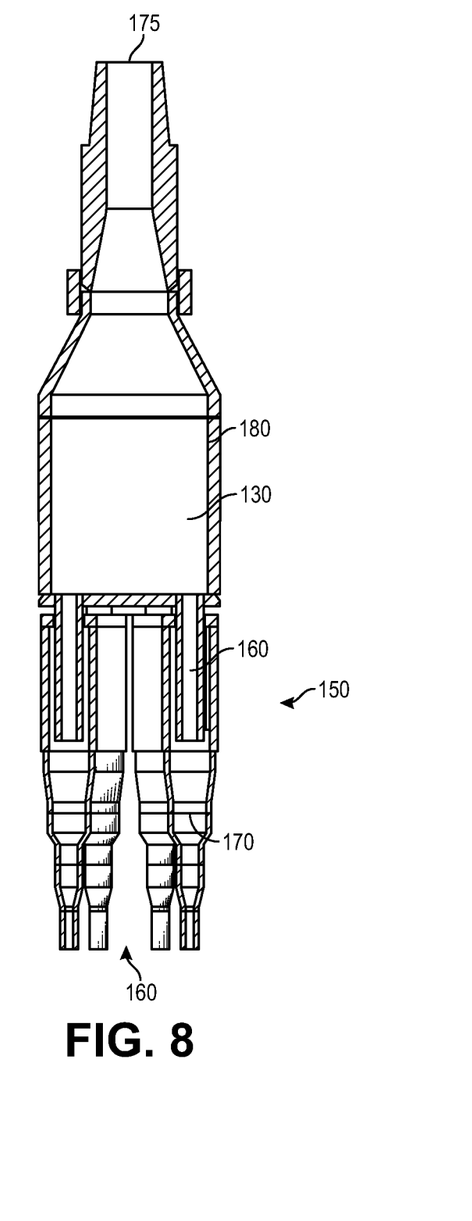
FIG. 8 illustrates a sectional view taken along line 8-8 in FIG. 7.

FIG. 8 illustrates a sectional view taken along line 8-8 in FIG. 7. As shown in FIG. 8, each cyclone 170 includes a tube 165 connected to an outlet manifold 180 of the cyclone separator 130. Multi-phase fluid enters into the inlet(s) 155 (see FIG. 7) and flows around an interior of the cyclone(s) 170, which causes the second portion of particles to drop out of the fluid toward the particle outlet 160. At substantially the same time, clean fluid flows through the tube 165 and into the outlet manifold 180 of the cyclone separator 130 and subsequently flows out of the fluid outlet 175. As used herein, "clean fluid" refers to the multi-phase fluid after the first portion of particles and/or the second portion of particles have been removed. The fluid outlet 175 of the cyclone separator 130 is in fluid communication with the outlet 115 of the dual-stage separator 100 (see FIG. 4).

In at least one embodiment, the multi-phase fluid may enter the cyclones 170 through the inlet(s) 155 and the particle outlet(s) 160. More particularly, in some situations, the cyclones 170 may be configured such that the multi-phase fluid may flow up into the cyclones 170 through the particle outlet(s) 160 at substantially the same time as the multi-phase fluid flows into the cyclones 170 through the inlet(s) 155. Thus, the particle outlet(s) 160 may have the multi-phase fluid flow (e.g., upward) therethrough and (e.g., simultaneously) have the second portion of the particles flow/fall (e.g., downward) therethrough.

Figure 9:
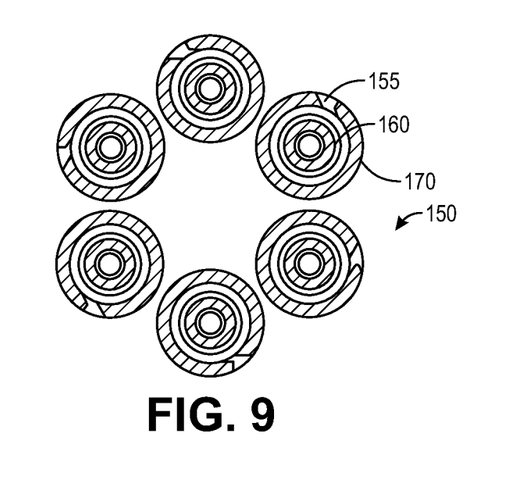
FIG. 9 illustrates a sectional view taken along line 9-9 in FIG. 7.

FIG. 9 illustrates a sectional view taken along line 9-9 in FIG. 7. As shown in FIG. 9, the cyclone separator 130 includes six individual cyclones 170 that are circumferentially-offset from one another. However, it should be noted that the cyclone separator 130 may include any number of cyclones 170 (e.g., 2, 3, 4, 5, 6, or 7) without departing from the scope of the disclosure. The selection of the number of cyclones 170 may be based upon the amount of production volume from the well. For instance, if the production volume is low, then less cyclones 170 may be needed. If the production volume is high, then more cyclones 170 may be needed. The number of cyclones 170 may be used to optimize performance of the dual-stage separator 100 based upon well fluid proportions. Each cyclone 170 includes the inlet 155 and the tube 165. As shown, the tangential arrangement of the inlet 155 and the alignment with the flow vector from the first stage 190 ensure turbulence is kept to a minimum and the flow paths remain smooth and laminar.

Figure 10:
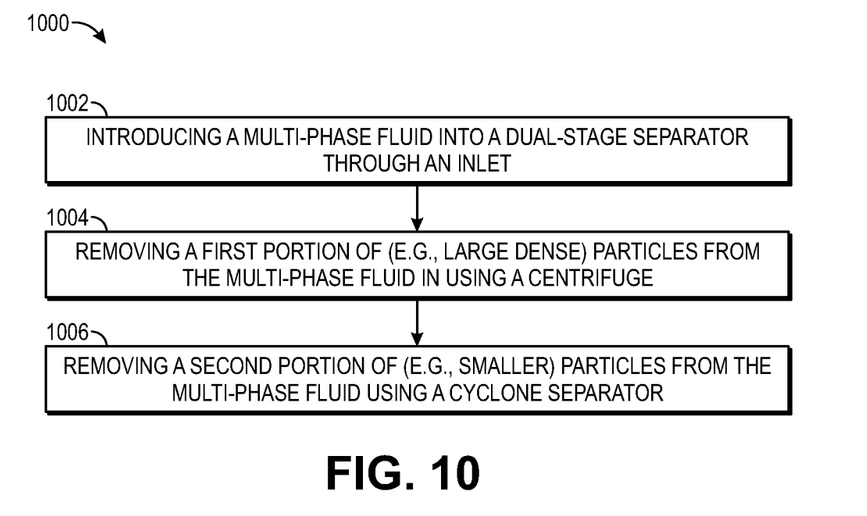
FIG. 10 illustrates a flowchart of a method for removing particles from a multi-phase fluid, according to an embodiment.

FIG. 10 illustrates a flowchart of a method 1000 for removing particles from a multi-phase fluid, according to an embodiment. The method 1000 may include introducing multi-phase fluid into the dual-stage separator 100 through the inlet 110, as at 1002. The multi-phase fluid may then flow into the first stage 190 (i.e., the centrifuge 195).

The method 1000 may also include removing a first portion of (e.g., large dense) particles from the multi-phase fluid in the first stage 190 using the centrifuge 195, as at 1004. More particularly, as the multi-phase fluid travels through the circular path of the centrifuge 195, the first portion of particles in the multi-phase fluid may contact the interior wall 90 of the pressure vessel 105 and drop into the particle collection chamber 135 of the pressure vessel 105. The remainder of the multi-phase fluid may flow into the second stage 150 (i.e., the cyclone separator 130).

The method 1000 may also include removing a second portion of (e.g., smaller) particles from the multi-phase fluid in the second stage 150 using the cyclone separator 130, as at 1006. More particularly, in the second stage, the remainder of the multi-phase fluid flows into the cyclones 170 (via the inlet 155) and around the interior of the cyclone 170, which causes the second portion of particles to drop out of the fluid, toward the particle outlet 160, and into the particle collection chamber 135. The clean fluid in the cyclone 170 flows through the tube 165 and into the outlet manifold 180 of the cyclone separator 130 and subsequently out of the fluid outlet 175. The clean fluid then flows out of the fluid outlet 175 and to the outlet 115 of the dual-stage separator 100.

Figure 11:
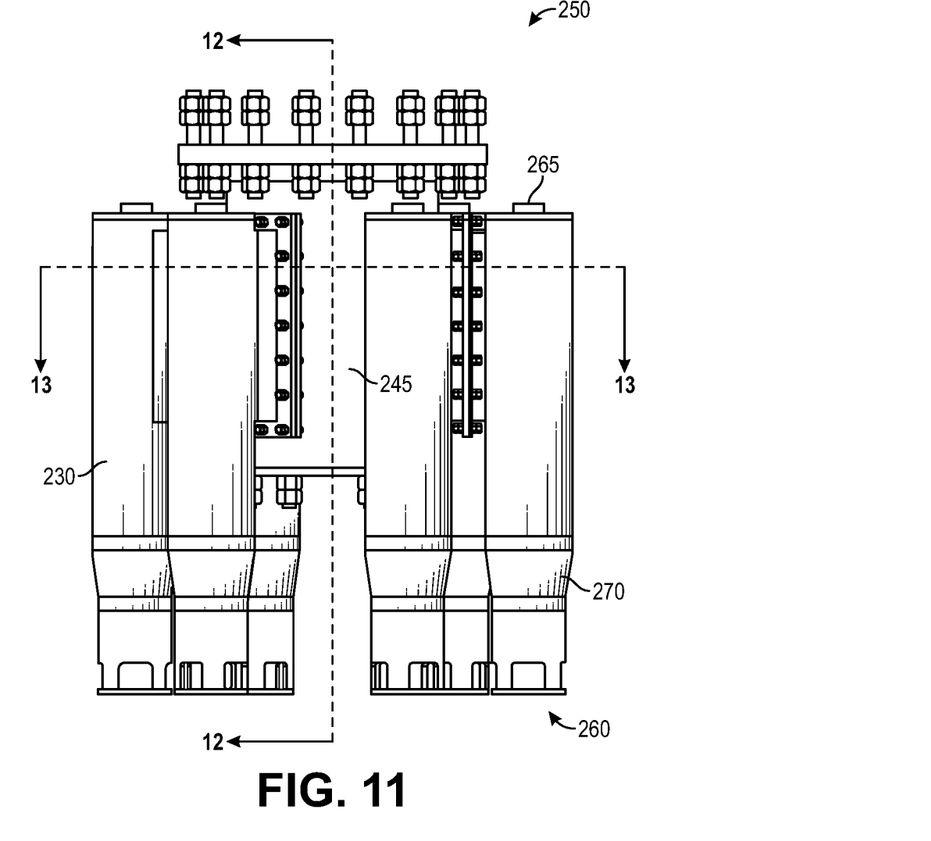
FIG. 11 illustrates a side view of a second stage of the dual-stage separator, according to an embodiment.

FIG. 11 illustrates a view of an alternative second stage 250 of the dual-stage separator 100, according to an embodiment. The second stage 250 has a substantially similar function as the second stage 150 described above. For example, the second stage 250 includes a cyclone separator 230 that includes a plurality of cyclones 270.

Figure 12:
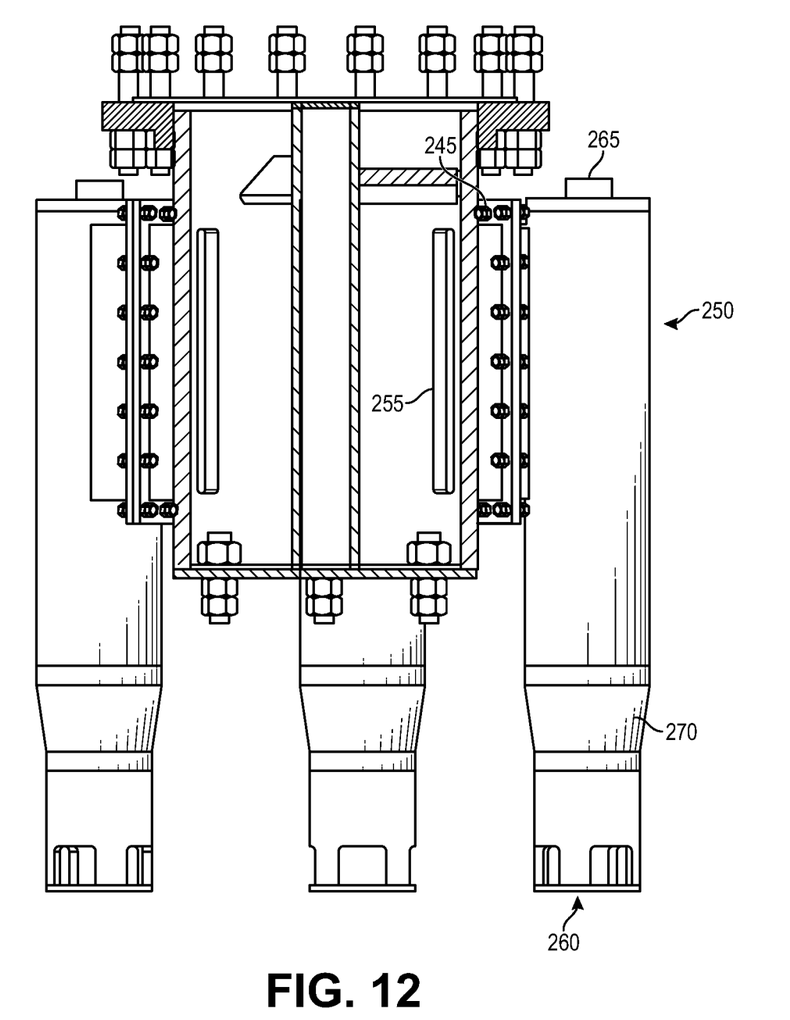
FIG. 12 illustrates a sectional view taken along line 12-12 in FIG. 11.

FIG. 12 illustrates a sectional view taken along line 12-12 in FIG. 11. As shown in FIG. 12, each cyclone 270 has an inlet 255 connected to an inlet manifold 245. Further, each cyclone 270 includes a tube 265 in fluid communication with the outlet 115 of the dual-stage separator 100. Additionally, each cyclone 270 includes a particle outlet 260 that is in communication with the particle collection chamber 135 of the dual-stage separator 100.

Figure 13:
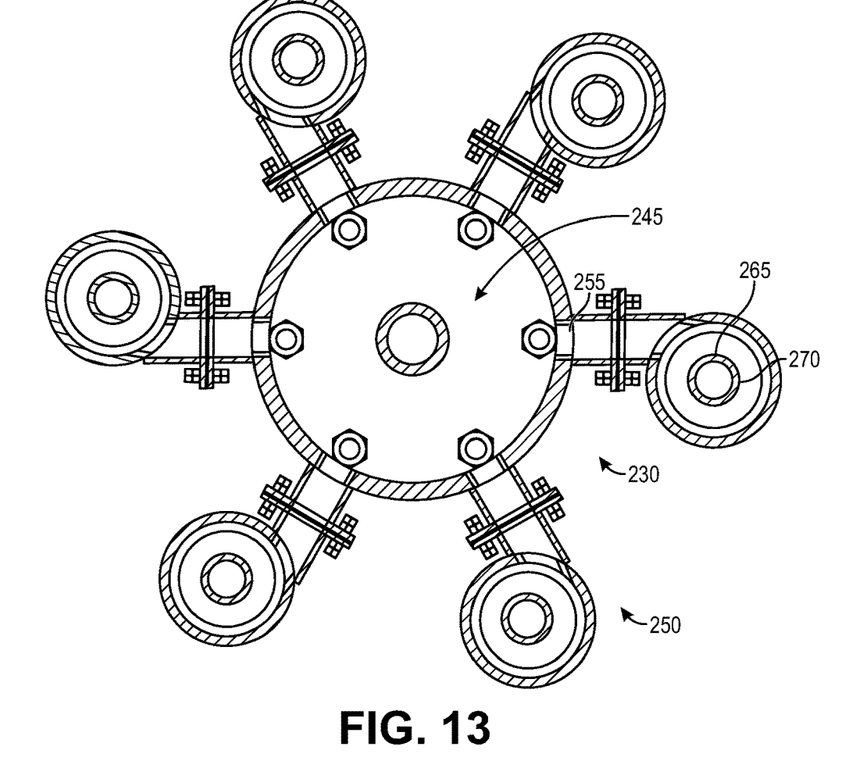
FIG. 13 illustrates a sectional view taken along line 13-13 in FIG. 11.

FIG. 13 illustrates a sectional view taken along line 13-13 in FIG. 11. As shown in FIG. 13, the cyclone separator 230 includes six individual cyclones 270 that are circumferentially-offset from one another. As discussed above, it should be noted that the cyclone separator 230 may include any number of cyclones 270 (e.g., 2, 3, 4, 5, 6, or 7) without departing from the principles of the invention. The selection of the number of cyclones 270 may be based upon the amount of production volume from the well. For instance, if the production volume is low, then less cyclones 270 may be needed. If the production volume is high, then more cyclones 270 may be needed. The number of cyclones 270 may be used to optimize performance of the dual-stage separator based upon well fluid proportions.

Figure 14:
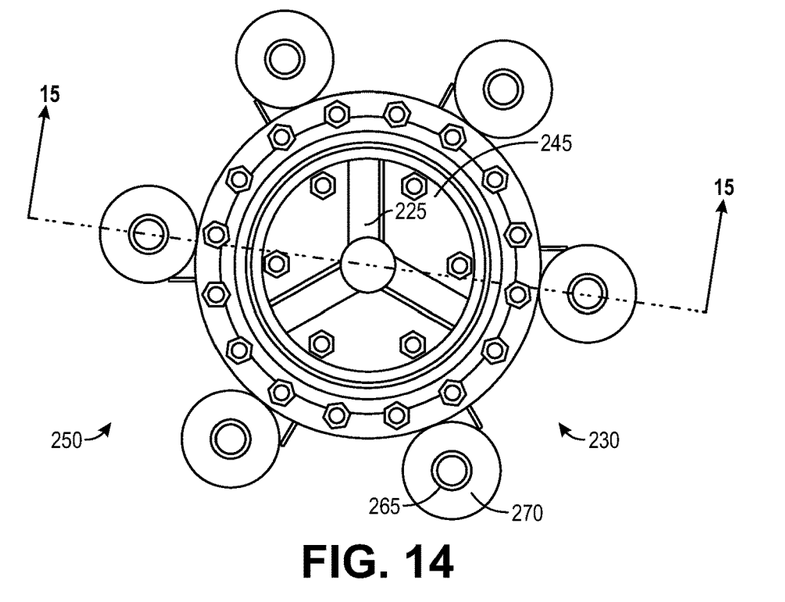
FIG. 14 illustrates a top view of a cyclone separator, according to an embodiment.
Figure 15:
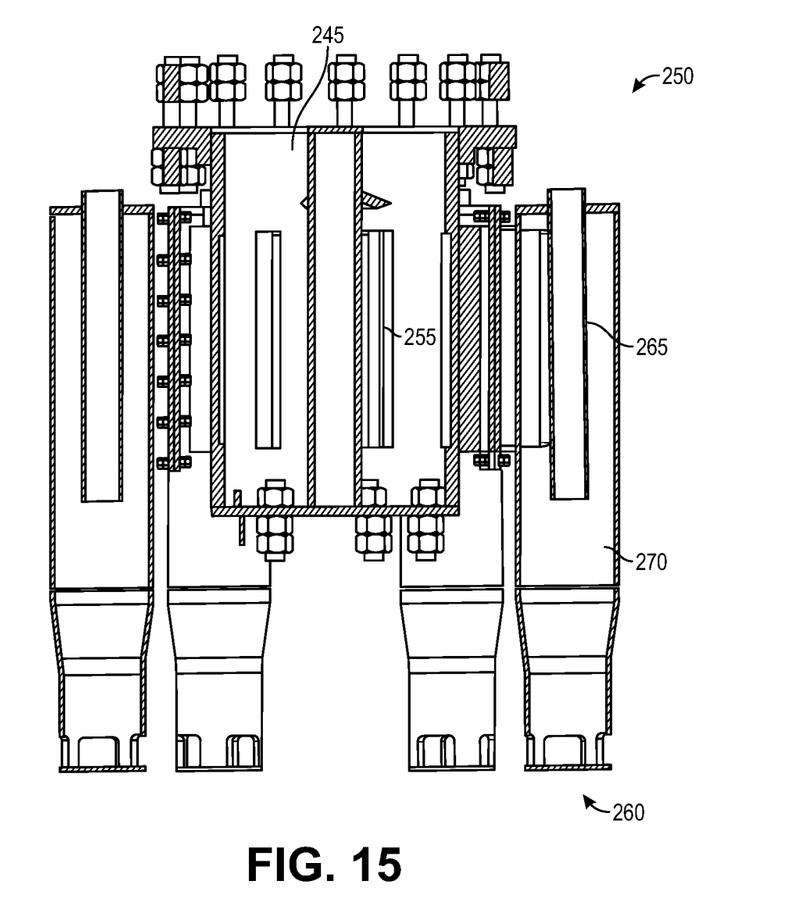
FIG. 15 illustrates a sectional view taken along line 15-15 in FIG. 14.

FIG. 14 illustrates a top view of the cyclone separator 230, according to an embodiment. The inlet manifold 245 includes an inlet flow vane (also known as a stator) 225. FIG. 15 illustrates a sectional view taken along line 15-15 in FIG. 14. As shown on FIG. 15, the inlet 255 of the cyclone 270 is connected to the inlet manifold 245. Multi-phase fluid enters the inlet flow vane 225 of the inlet manifold 245. Next, the multi-phase fluid flows from the inlet manifold 245 into each cyclone 270 via the inlet 255. Thereafter, the multi-phase fluid flows around an interior of the cyclone 270, which causes particles to drop out of the fluid toward the particle outlet 260. At substantially the same time, the clean fluid flows through the tube 265 and subsequently out of the outlet 115 of the dual-stage separator 100.

Figure 16:
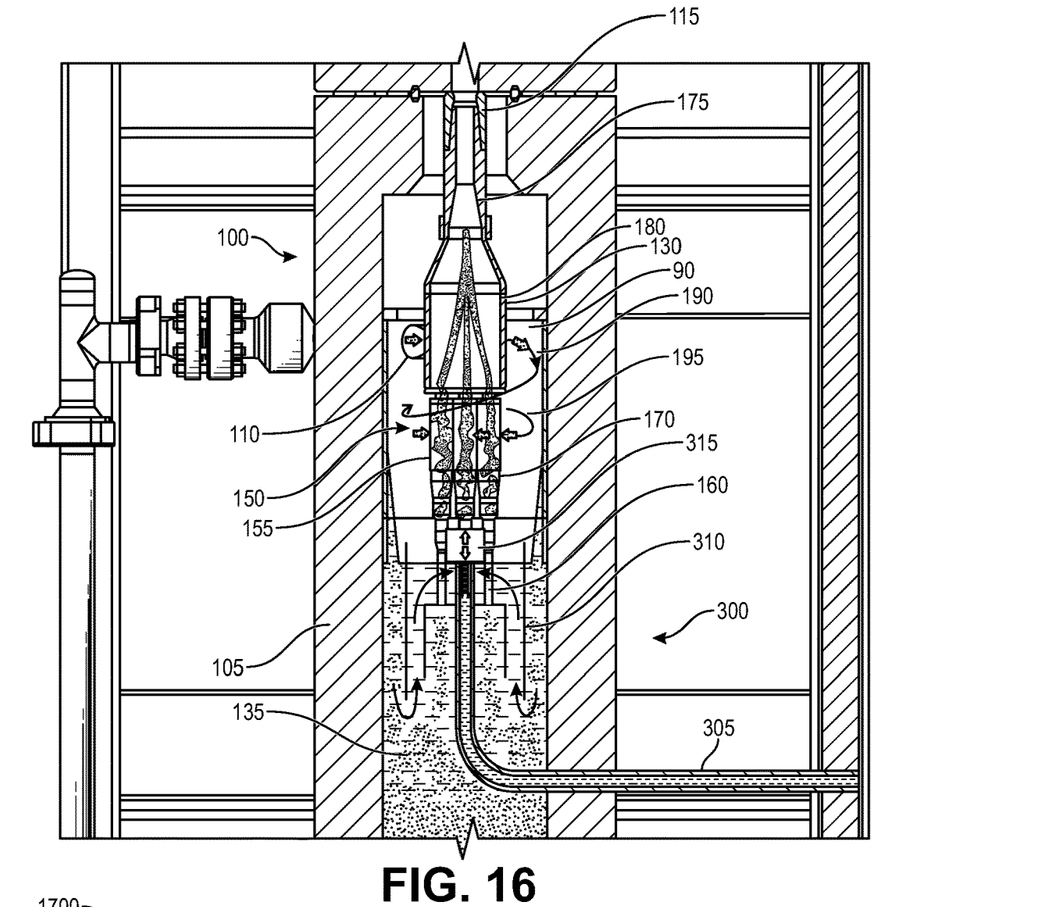
FIG. 16 illustrates a side view the dual-stage separator with a water level device, according to an embodiment.

FIG. 16 illustrates a side view the dual-stage separator 100 with a water level device 300, according to an embodiment. The water level device 300 includes a drain tube 305, optional baffles 310, and an optional float valve 315. The float valve 315 may allow heavier liquids to flow into the drain tube 305 while substantially preventing gas-phase fluid from flowing into the drain tube 305. Generally, the water level device 300 is configured to maintain a predetermined water level in the pressure vessel 105.

Figure 17:
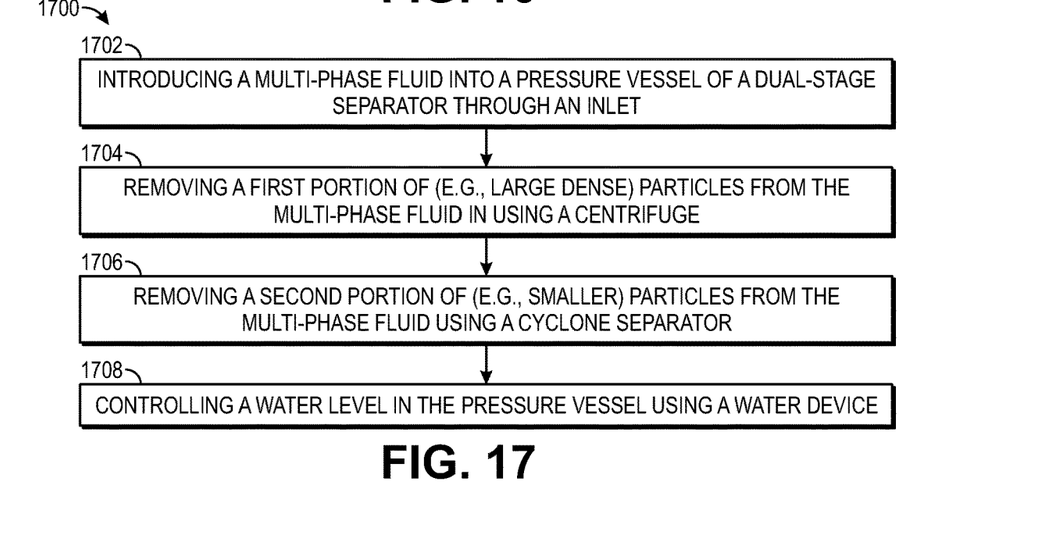
FIG. 17 illustrates a flowchart of another method for removing particles from a multi-phase fluid, according to an embodiment.

FIG. 17 illustrates a flowchart of another method 1700 for removing particles from a multi-phase fluid, according to an embodiment. The method 1700 may include introducing multi-phase fluid into the dual-stage separator 100 through the inlet 110, as at 1702. Next the multi-phase fluid enters the first stage 190 (i.e., the centrifuge 195).

The method 1700 may also include removing a first portion of (e.g., large dense) particles from the multi-phase fluid in the first stage 190 using the centrifuge 195, as at 1704. More particularly, as the multi-phase fluid flows through the circular path of the centrifuge 195, the first portion of particles may contact the interior wall 90 of the pressure vessel 105 and drop into the particle collection chamber 135 of the pressure vessel 105. The remainder of the fluid may flow into the second stage 150 (i.e., the cyclone separator 130).

The method 1700 may also include removing a second portion of (e.g., smaller) particles from the multi-phase fluid in the second stage 150 using the cyclone separator 130, as at 1706. More particularly, in the second stage, the remainder of the multi-phase fluid flows into the cyclones 170 (via the inlet 155) and around the interior of the cyclone 170, which causes second portion of particles to drop out of the fluid, toward the particle outlet 160, and into the particle collection chamber 135. The clean fluid flows through the tube 165 and into the outlet manifold 180 of the cyclone separator 130 and subsequently out of the fluid outlet 175. The clean fluid the flows out of the fluid outlet 175 and to the outlet 115 of the dual-stage separator 100.

In some situations, fluid (e.g., water) may fill a portion of the pressure vessel 105 which may cause the dual-stage separator 100 to function inefficiently. The method 1700 may also include controlling the water level in the pressure vessel 105 using the water device 300, as at 1708. This may include maintaining the water level below a predetermined level. More particularly, as the water level in the pressure vessel 105 reaches a predetermined level, the float valve 315 opens to allow the water to drain out of the drain tube 305. The baffles 310 in the pressure vessel 105 are configured to create a tortuous path for the particles in the particle collection chamber 135 such that the fluid in pressure vessel 105 flows out the drain tube 305 rather than the particles. In some embodiments, the water device 300 may operate without the use of the float valve 315 by positioning the inlet of the drain tube 305 at a predetermined location of the pressure vessel 105 such that water flows into the drain tube 305 when the water level reaches the inlet of the drain tube 305.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for removing particles from a fluid, the apparatus comprising:
   a pressure vessel having an inlet and an outlet;
   a centrifuge disposed in the pressure vessel, the centrifuge being configured to remove a first portion of particles from the fluid; and
   a cyclone separator disposed in the pressure vessel, such that the centrifuge extends around the cyclone separator, the cyclone separator comprising an array of cyclones configured to remove a second portion of particles from the fluid.

2. The apparatus of claim 1, wherein the particles of the first portion are larger than the particles of the second portion, and wherein the centrifuge is configured to remove the first portion of particles from the fluid prior to the cyclone separator removing the second portion of particles from the fluid.

3. The apparatus of claim 1, wherein the pressure vessel further includes a particle collection chamber configured to receive the first portion of particles and the second portion of particles.

4. The apparatus of claim 3, wherein the pressure vessel further includes a valve disposed proximate the particle collection chamber, the valve being configured to allow the particles to be removed from the pressure vessel.

5. The apparatus of claim 3, wherein the pressure vessel comprises one or more baffles that create a tortuous path for the particles in the particle collection chamber.

6. The apparatus of claim 1, further including a water level device disposed in the pressure vessel, the water level device being configured to maintain a water level below a predetermined level in the pressure vessel.

7. The apparatus of claim 6, wherein the water level device includes a flow tube having a portion disposed in the pressure vessel.

8. The apparatus of claim 1, wherein the cyclones in the array of cyclones are circumferentially-offset from one another.

9. The apparatus of claim 8, wherein the inlet of each cyclone allows the fluid to enter each cyclone at a vector of a velocity of the fluid.

10. The apparatus of claim 8, wherein each cyclone includes an inlet, a fluid outlet, and a particle outlet.

11. The apparatus of claim 10, wherein the fluid outlet of each cyclone is in fluid communication with the outlet of the pressure vessel.

12. The apparatus of claim 10, wherein each cyclone is configured to have the fluid flow through the inlet and through the particle outlet substantially simultaneously.

13. The apparatus of claim 12, wherein each cyclone is configured to have the fluid flow through the particle outlet in a first direction and have the second portion of particles flow through the particle outlet in a second direction that opposes the first direction.

14. A method of removing particles from a multi-phase fluid, the method comprising:
   placing a dual-stage separator in fluid communication with a source of the multi-phase fluid, the dual-stage separator having a cyclone separator and a centrifuge positioned around and upstream of the cyclone separator, wherein the cyclone separator comprises an array of cyclones;
   removing a first portion of particles from the multi-phase fluid as the multi-phase fluid passes through the centrifuge; and
   removing a second portion of particles from the multi-phase fluid as the multi-phase fluid passes through the cyclone separator.

15. The method of claim 14, further comprising collecting the first portion of particles and the second portion of particles.

16. The method of claim 14, further comprising maintaining a predetermined water level in the dual-stage separator.

17. An apparatus for removing solid particles from a multi-phase fluid flow, the apparatus comprising:
   a cylindrical high-pressure vessel with a vertical axis;
   a centrifuge disposed within the high-pressure vessel at a location that is concentric with the vertical axis of the vessel; and
   an array of cyclones disposed within the high-pressure vessel at a location that is concentric with the vertical axis of the vessel, wherein the centrifuge is positioned around the cyclones, wherein an inlet of the high-pressure vessel is directed tangentially into an annular space formed between an inner surface of the high-pressure vessel and an outer surface of the cyclones, and wherein an inlet of each of the cyclones is in communication with an innermost flow path of the annular space.

18. The apparatus of claim 17, wherein the cyclones in the array of cyclones are circumferentially-offset from one another.

19. The apparatus of claim 17, further comprising a water level device disposed in the high-pressure vessel, wherein the water level device comprises a flow tube and a float valve.

20. The apparatus of claim 19, wherein the float valve is configured to open to allow water to drain out of the high-pressure vessel to maintain a water level in the high-pressure vessel below a predetermined level.

* * * * *